United States Patent
Long et al.

[19]

[11] Patent Number: 6,166,811
[45] Date of Patent: Dec. 26, 2000

[54] ROBOT-BASED GAUGING SYSTEM FOR DETERMINING THREE-DIMENSIONAL MEASUREMENT DATA

[75] Inventors: William D. Long, Ann Arbor; Charles C. Kingston, Wixom, both of Mich.

[73] Assignee: Perceptron, Inc., Plymouth, Mich.

[21] Appl. No.: 09/372,871

[22] Filed: Aug. 12, 1999

[51] Int. Cl.[7] .................................................. G02B 21/22
[52] U.S. Cl. ........................................ 356/376; 356/375
[58] Field of Search .................................... 356/376, 375, 356/380

[56] References Cited

U.S. PATENT DOCUMENTS

| | | |
|---|---|---|
| 4,841,460 | 6/1989 | Dewar et al. . |
| 5,142,160 | 8/1992 | Storbeck . |
| 5,184,733 | 2/1993 | Arnarson et al. . |
| 5,212,539 | 5/1993 | Wögerbauer . |
| 5,319,443 | 6/1994 | Watanabe et al. . |
| 5,400,638 | 3/1995 | Kim . |
| 5,517,311 | 5/1996 | Takeuchi et al. . |
| 5,699,161 | 12/1997 | Woodworth . |
| 5,719,678 | 2/1998 | Reynolds et al. . |
| 5,793,900 | 8/1998 | Nourbakhsh et al. ................... 382/263 |
| 5,864,404 | 1/1999 | Amorosi . |
| 5,978,092 | 11/1999 | Brown ..................................... 356/376 |
| 6,044,170 | 3/2000 | Migdal et al. .......................... 382/154 |
| 6,057,909 | 5/2000 | Yahav et al. ............................ 356/5.04 |

FOREIGN PATENT DOCUMENTS

WO9912082  3/1999  WIPO .

*Primary Examiner*—Frank G. Font
*Assistant Examiner*—Layla Lauchman
*Attorney, Agent, or Firm*—Harness, Dickey & Pierce, P.L.C.

[57] ABSTRACT

A robot-based gauging system is provided for determining three-dimensional measurement data of the surface of an object. The robot-based gauging system includes a robot having at least one movable member and a robot controller for controlling the movement of the movable member in relation to the surface of an object. A non-contact sensor is coupled to the movable member of the robot for capturing image data representative of the surface of the object. A position reporting device reports position data representative of the position of the non-contact sensor. A synch signal generator for generating and transmitting a synch signal is electrically connected to each of the non-contact sensor and the position reporting device, such that the non-contact sensor reports image data in response to the synch signal and the position reporting device reports position data in response to the synch signal. The robot-based gauging system further includes a vision system adapted to retrieve image data from the non-contact sensor and position data from the position reporting device, whereby the vision system synchronizes the image data with the position data in order to determine three-dimensional measurement data for the object.

19 Claims, 5 Drawing Sheets

ROBOT-BASED GAUGING SYSTEM FOR DETERMINING THREE-DIMENSIONAL MEASUREMENT DATA

BACKGROUND AND SUMMARY OF THE INVENTION

The present invention relates generally to non-contact gauging systems and, more particularly, a robot-based gauging system and method for determining three-dimensional measurement data of an object.

Demand for higher quality has pressed manufacturers of mass produced articles, such as automotive vehicles, to employ automated manufacturing techniques that were unheard of when assembly line manufacturing was first conceived. Today, robotic equipment is used to assemble, weld, finish, gauge and test manufactured articles with a much higher degree of quality and precision than has been heretofore possible. Computer-aided manufacturing techniques allow designers to graphically conceptualize and design a new product on a computer workstation and the automated manufacturing process ensures that the design is faithfully carried out precisely according to specification. Machine vision is a key part of today's manufacturing environment. Machine vision systems are used with robotics and computer-aided design systems to ensure quality is achieved at the lowest practical cost.

In a typical manufacturing environment, there may be a plurality of different non-contact sensors, such as optical sensors, positioned at various predetermined locations within the workpiece manufacturing, gauging or testing station. In order to obtain three-dimensional measurement data using a two-dimensional non-contact sensor, the sensor may be moved in relation to the workpiece. Therefore, it is important to know the exact location and orientation of the moving item (either the sensor or the workpiece) each time the sensor acquires image data of the workpiece. This tends to be fairly straightforward for accurate motion devices (e.g., a CMM), since the reported position reflects the actual position of the device. The motion controller of an accurate motion device may include various compensation factors that get applied to the motion control to ensure the commanded position matches the actual position of the device. However, the high cost associated with these types of motion devices is prohibitive to them being used in a typical manufacturing environment.

As an alternative to these more expensive motion devices, it is possible to use a conventional industrial robot as the motion device in the gauging system. By affixing the non-contact sensor to the industrial robot, the robot can be used to move the sensor in relation to the workpiece. Industrial robots are well suited to perform complex motion sequences which are customized for the workpiece. In addition, many standard industrial tools are available which allow the programming of the motion sequences to be performed off-line and subsequently downloaded to the robot controller.

The problem with a robot-based gauging system is that the conventional industrial robot is not an inherently accurate motion device. Robot controllers generally utilize ideal kinematic models when instructing robot motion. The physical characteristics of the robot arm vary slightly from the ideal model, and thus the actual movement of the robot arm varies slightly from the commanded motion sequence. Furthermore, these physical characteristics are likely to change as the robot is subject to wear and thermal changes. Most robot controllers are not equipped with any additional means for translating and/or correcting the reported position into an actual position of the robot arm. As a result, conventional industrial robots have not heretofore been used in non-contact gauging systems and other highly accurate manufacturing workstation applications.

To this end, the robot-based gauging system of the present invention accurately determines three-dimensional measurement data for a workpiece through the use of a synchronized scanning process without the need for an expensive motion device, such as a CMM.

The gauging system includes a robot having at least one movable member and a robot controller for controlling the movement of the movable member in relation to the surface of an object. A non-contact sensor is coupled to the movable member of the robot for capturing image data representative of the surface of the object. A position reporting device is used to report position data representative of the position of the non-contact sensor. In addition, a synch signal generator is used to generate and transmit a synch signal to each of the non-contact sensor and the position reporting device, wherein the non-contact sensor reports image data in response to the synch signal and the position reporting device reports position data in response to the synch signal.

The gauging system further includes a vision system adapted to retrieve image data from the non-contact sensor and position data from the position reporting device. As the non-contact sensor scans the surface of the object, there is a time latency between when the sensor strobes its laser to when processed image data is available to the vision system. In other words, the image data reported by the sensor lags in time behind the position data reported by the position reporting device. Therefore, the vision system must be able to synchronize the image data with the position data. A memory storage space is used to store position data so that the vision system can synchronize the image data with the position data. In this way, the robot-based gauging system of the present invention is able to quickly and accurately determine three-dimensional measurement data for the object.

For a more complete understanding of the invention, its objects and advantages, reference may be had to the following specification and to the accompanying drawings.

DESCRIPTION OF THE PREFERRED EMBODIMENT

Figure 1:
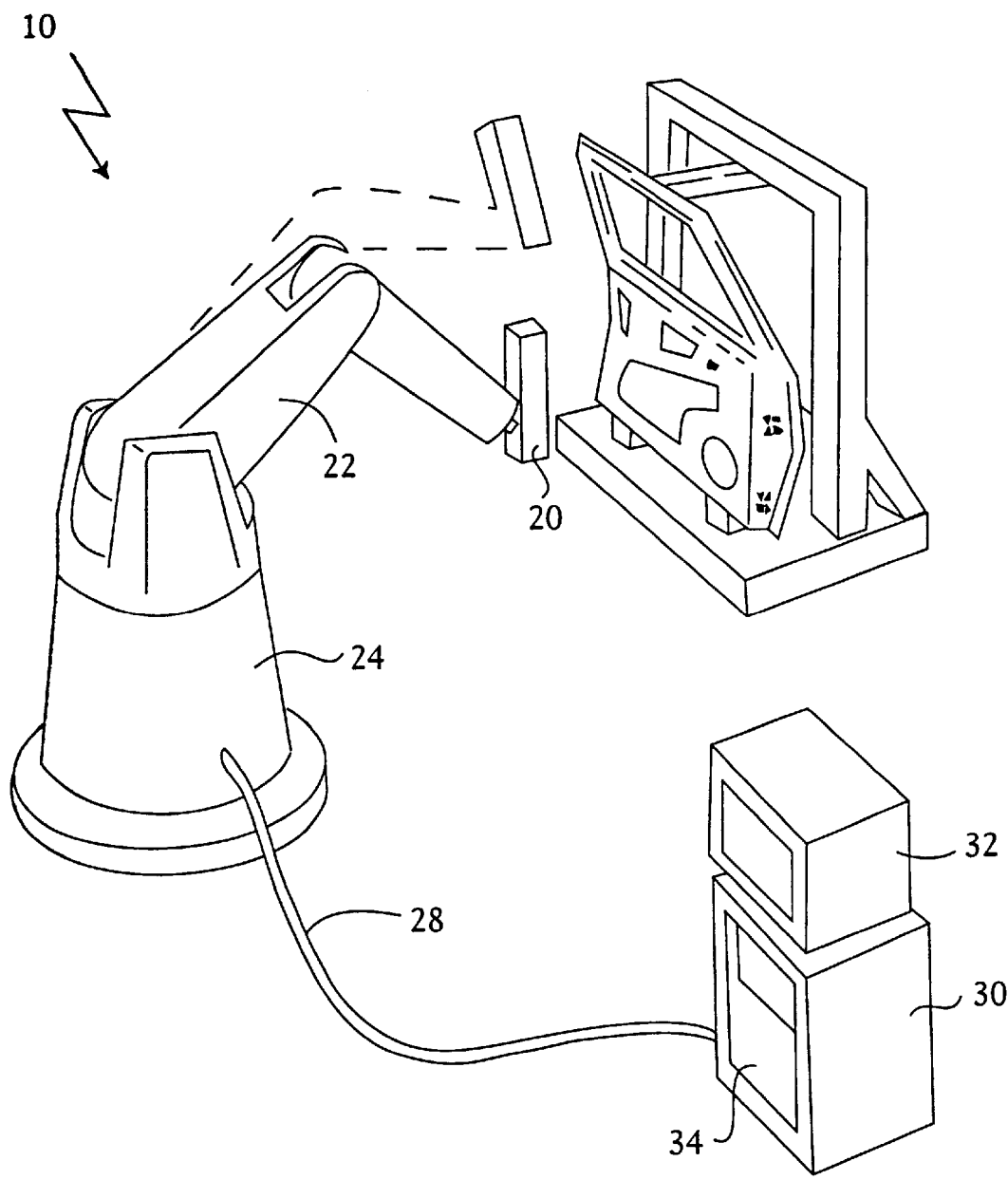
FIG. 1 is a perspective view of a robot-based gauging station incorporated into an automotive door assembly line in accordance with the present invention.

An exemplary robot-based gauging system of the type commonly employed in vehicle assembly lines or other automotive applications is shown in FIG. 1. A robot-based gauging system 10 is often used for ensuring that each vehicle body component is assembled within predefined tolerances. For example, the robot-based gauging system 10 may measure the door of a vehicle body 12. Although the invention is not limited to automotive applications, an exemplary use for the robot-based gauging system 10 would be in an automotive assembly plant.

A single non-contact sensor 20 is mounted on a robot arm 22 of a robot 24. The sensor 20 in the present embodiment is a contour sensor which is only capable of two dimensional (2D) measurements. During operation, the sensor 20 emits a planar structured light pattern. By illuminating the workpiece, a characteristic reflected light pattern is achieved which can be detected by the sensor 20. The contour sensor can measure (through triangulation) in two dimensions a plane on the reflecting workpiece. For further details regarding a suitable structured light sensor, reference may be had to U.S. Pat. No. 4,645,348 to Dewar et al., assigned to the assignee of the present invention.

Communication cables 28 connect the sensor 20 and the controller of the robot 24 to a machine vision computer 30 which includes a CRT (cathode ray tube) display 32. A printer 34 is optionally provided with a typical machine vision computer.

In order to generate a three-dimensional representation of the workpiece, the robot arm 22 is movable to a plurality of positions for measuring the periphery of a workpiece (e.g., a door). In contrast to the static approach that requires the sensor to stop and settle for each image acquisition, the sensor 20 can continuously acquire data as the robot arm 22 traverses the surface of a workpiece. In other words, three-dimensional measurement data for the workpiece may be acquired by "scanning" or continuously moving the two-dimensional measurement sensor in relation to the workpiece. In addition, the gauging system 10 is also able to report the three-dimensional measurement data with respect to a predetermined reference frame or coordinate system associated, for example, with the automobile body 14 to be measured, or with respect to an external reference frame associated with the gauging station.

Figure 2:
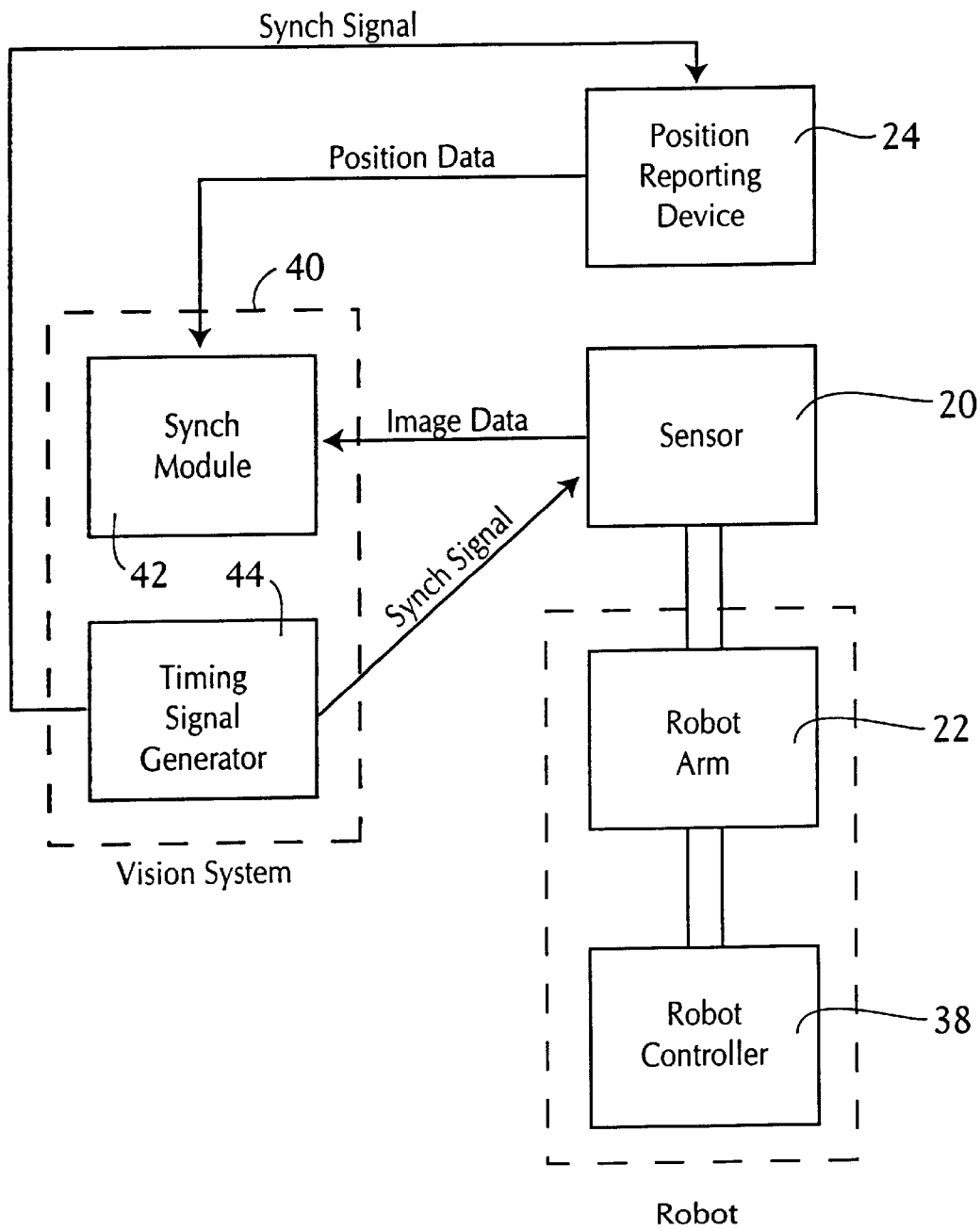
FIG. 2 illustrates the primary components of a robot-based gauging system in accordance with the present invention.

FIG. 2 illustrates the basic components associated with the robot-based gauging system 10. A non-contact sensor 20 is affixed to the end of a robot arm 22 which in turn is connected to a robot controller 38. In operation, the robot controller 38 is operative to control the movement of the robot arm 22 in relation to the surface of an object to be gauged by the system, and the non-contact sensor 20 is operative to capture image data representative of a portion of the surface of the object. A position reporting device 24 is used to report position data representative of the position of the non-contact sensor 20. The non-contact sensor 20 and the position reporting device 24 are each in turn electrically connected to a vision system 40 residing on the machine vision computer 30.

As will be further described below, the position of the sensor 20 can be reported either directly or indirectly by the position reporting device 24. In the direct approach, the actual position of the sensor 20 is reported (e.g., by a photogrammetry system) to the vision system 40, whereas in the indirect approach, the position of the sensor 20 is deduced from the position of the robot arm 22 which is reported (e.g., by the robot controller) to the vision system 40. Lastly, the vision system 40 synchronizes the image data with the position data, thereby determining three-dimensional measurement data for the workpiece.

More specifically, the vision system 40 includes a synchronization module 42 and a timing signal generator 44. To synchronize the image data received from the sensor 20 with the position data received from the position reporting device 24, the vision system 40 uses a timing signal or a hardware latch signal which is generated by the timing signal generator 44. The timing signal is then simultaneously transmitted to the sensor 20 and the position reporting device 24. In response to the timing signal, the sensor 20 records image data for the workpiece and the position reporting device 24 records current position data for the non-contact sensor 20. Image data and position data can then be requested by and delivered to the vision system 40. Thus, the vision system 40 acquires the measurement data needed to construct a contour line representative of the surface of the workpiece. It should be noted that the vision system does not rely on the sensor motion being at a constant velocity in relation to the workpiece. On the contrary, it is envisioned that the velocity of the sensor may vary as it scans the workpiece.

Figure 3:
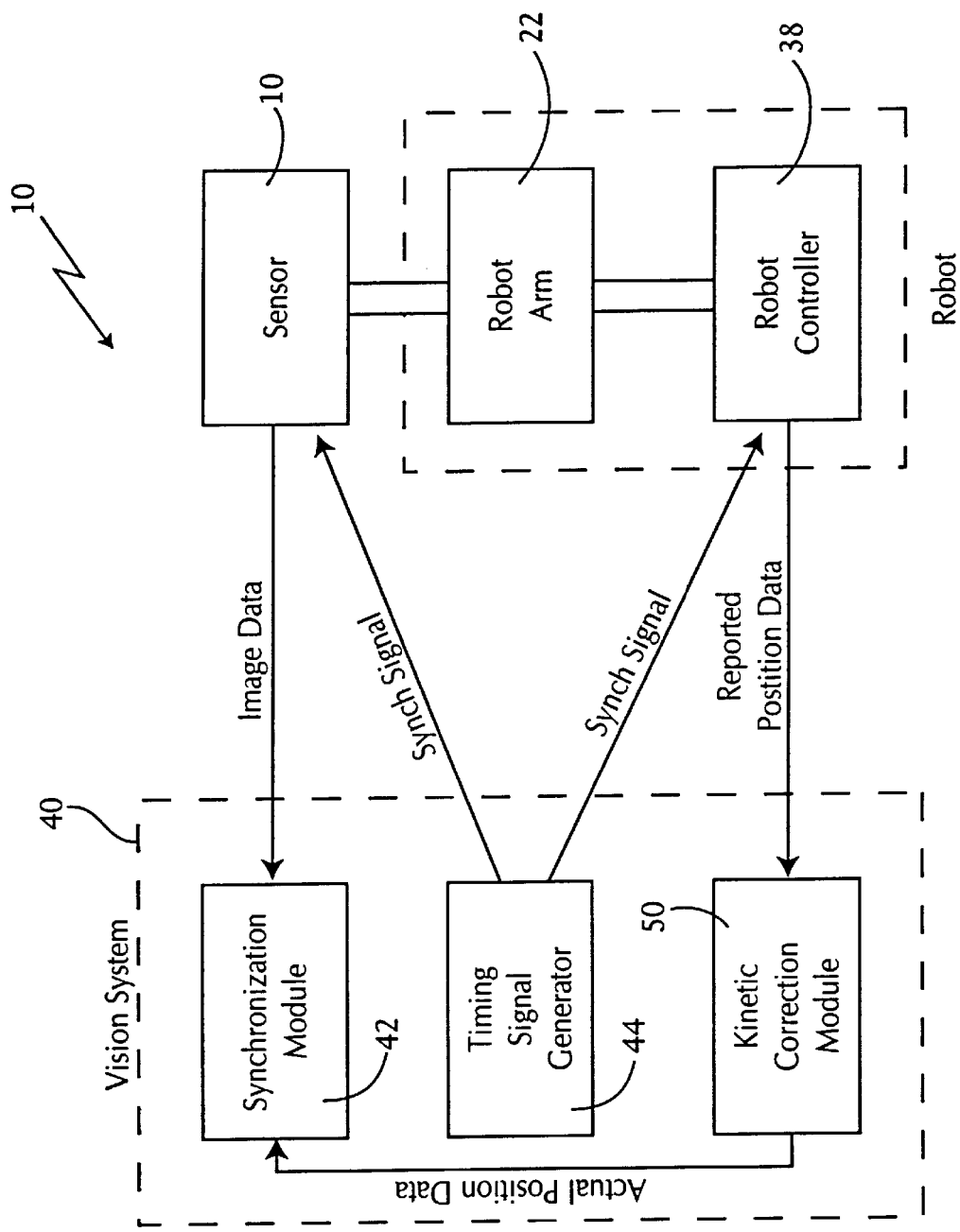
FIG. 3 is a block diagram showing a first preferred embodiment of the robot-based gauging system of the present invention.

A first preferred embodiment of a gauging system which utilizes the indirect approach to acquire position data is shown in FIG. 3. The indirect approach deduces the position of the sensor from the position of the robot arm 22. To do so, the position data is reported by the robot controller 38 to the vision system 40. However, as previously described, the actual position of the robot arm varies from the commanded position data as reported by the robot controller 38. Thus, the vision system 40 further incorporates a kinematic correction module 50 which applies a real time kinematic correction factor to the reported position data received from the robot controller 38. In a preferred embodiment, the DynaCal Robot Cell Calibration System developed by Dynalog, Inc. of Bloomfield Hills, Mich. may be adapted to serve as the kinematic correction module 50.

One skilled in the art will readily recognize that the kinematic correction module 50 incorporates a procedure that determines physical deviations between the actual robot and its corresponding ideal model. These deviations are stored as robot-specific parameters. In operation, the kinematic correction module 50 receives the reported position data from the robot controller 38. Since the robot controller 38 is unaware of the robot's physical deviations, the reported position data is based on the ideal model. The kinematic correction module 50 translates the reported position data into actual position data by using the robot-specific parameters. Next, the actual position data of the robot arm is transformed to position data for the sensor. The sensor position data is then provided to the synchronization module 42.

The non-contact sensor 20 is preferably a Tricam non-contact sensor which is manufactured by Perceptron, Inc. of Plymouth, Mich. While the following description is provided with reference to the Tricam non-contact sensor, it is readily understood that the explanation is applicable to other non-contact sensors. In the case of the Tricam sensor, the timing signal generator 44 is a software module that resides on a circuit board which can easily be incorporated into the machine vision computer 30. Moreover, the timing signal generator 44 is associated with the sensor 20, such that the hardware latch signal is generated internal to the sensor 20. In operation, the sensor generates a hardware latch signal each time it acquires image data. The sensor 20 is further configured to simultaneously transmit the hardware latch signal to the robot controller 38. It is also envisioned that the Tricam non-contact sensor may support an external input that allows for image acquisition to be initiated by an hardware latch signal which is generated external to the sensor 20. Thus, the timing signal generator 44 may be associated with some external computing device (e.g., the robot controller).

In order to "scan" the sensor in relation to the workpiece, image data must be captured at a rate which allows for the continuous motion of the sensor. In a continuous operation mode, the Tricam non-contact sensor is limited by the frame rate of its camera which operates at a frequency of 30 Hz. However, there is a time latency between when the sensor strobes its laser to when processed image data is available to the vision system 40. As a result, the image data reported by the sensor 20 lags in time behind the position data reported by the robot controller 38 by two frame times (e.g., 2/30 second). Accordingly, the image data received from the sensor 20 requires synchronization with the position data received from the robot controller 38.

Figure 4:
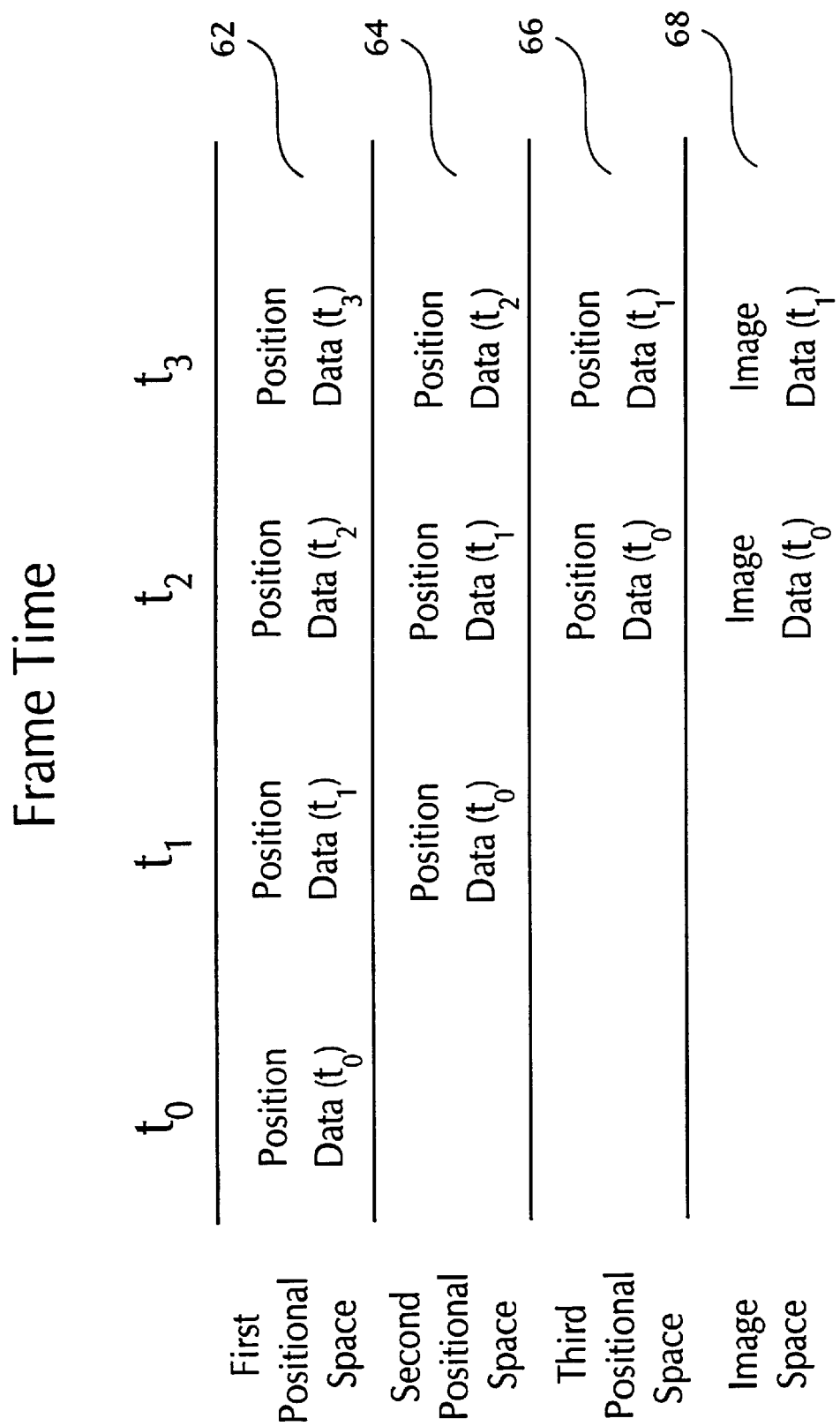
FIG. 4 illustrates the memory configuration used to synchronize the image data with the position data in the robot-based gauging system of the present invention.

The present invention synchronizes the image data with the position data as shown in FIG. 4. A memory space internal to the vision system is used to store and process position data received from the robot controller 38. The memory space is further defined into an image memory space for storing image data and at least three positional memory spaces for storing position data. A first timing signal causes the vision system to retrieve position data($t_0$) from the robot controller which is in turn stored in a first memory space 62. In response to a second timing signal, the vision system copies the position data($t_0$) in the first memory space 62 to a second memory space 64 and then retrieves the next available position data($t_1$) into the first memory space 62. Similarly, a third timing signal causes the position data($t_0$) in the second memory space 64 to be copied to a third memory space 66, the position data($t_1$) in the first memory space 62 to be copied to the second memory space 64, and new position data($t_2$) to be retrieved into the first memory space 62. In other words, the vision system 40 is able to store the three most recent sets of position data received from the robot controller 38

At this point, image data($t_0$) corresponding to the initial position data($t_0$) is available from the sensor to the vision system. In response to the third timing signal, this image data is read into the image memory space 68 of the vision system. By linking this image data with the position data stored in the third memory space 66, the vision system is able to accurately construct measurement data for the workpiece. For each additional timing signal, this synchronization process is repeated by the vision system.

As previously discussed, the operation of Tricam non-contact sensor varies slightly from the description provided in relation to FIG. 4. In the case of the Tricam sensor, a timing signal tells the vision system to retrieve the current image data from the sensor and to retrieve the current position data from the robot controller. The first instance of this timing signal does not occur until after the first set of image data has been processed and is available to the vision system. Since there are two frame times between the laser strobe and this first timing signal, the available position data no longer matches the available image data. In other words, the position data which is retreived in response to the first timing signal corresponds to the image data retrieved in response to the third timing signal. As a result, the first two sets of image data are discarded, and synchronization begins with the third set of image data.

Figure 5:
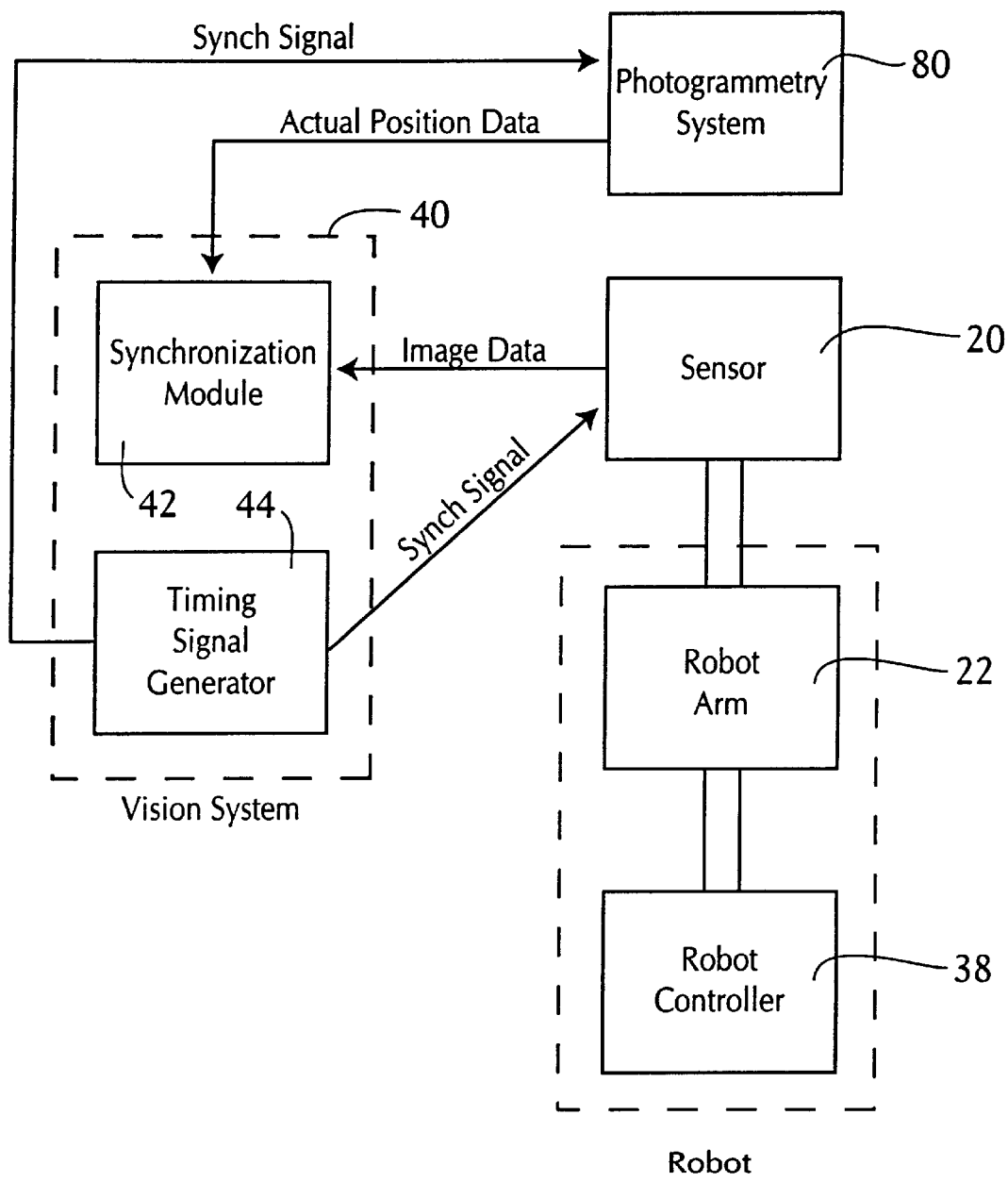
FIG. 5 is a block diagram showing a second preferred embodiment of a robot-based gauging system in accordance with the present invention.

Rather than determining the position of the sensor from the information provided by the robot controller, it is also envisioned that the position of the sensor is directly reported to the vision system 40 by an independent measurement system as shown in FIG. 5. While the following description is provided with reference to a photogrammetry system 80, it is readily understood that other measurement devices may be suitably used in conjunction with the present invention.

In this alternative embodiment of the present invention, one or more photogrammetric cameras are positioned at convenient vantage points in the gauging station. Each photogrammetric camera operates under conventional photogrammetry techniques. That is, the photogrammetric camera emits a burst of quasi-monochromatic light and its camera detects the reflection of this light. For example, retroreflective markers may be placed on the surface of the non-contact sensor 20. When the markers are illuminated by infrared light from a camera, light is reflected by the markers, as bright light spots, back to a motion capture unit within the camera. The light spots are analyzed, such that their position and sizes are calculated by the camera, thereby determining the position of the markers. It is envisioned that the photogrammtric camera may operate using other conventional operational techniques, including but not limited to tracking of luminous targets.

In any event, as long as the sensor is within the field of view of the photogrammetric cameras, the photogrammetry system will provide an accurate determination of the position of the sensor. In this way, the actual position of the sensor is reported to the vision system 40. It should be noted that since the photogrammetry system 80 reports the actual position of the sensor, there is no need for the kinematic correction module in this embodiment. This alternative embodiment of the robot-based gauging system 10 can otherwise operate as previously discussed in relation to FIGS. 1–4.

From the foregoing, it will be appreciated that the present invention provides a significant advance in the art of robot-based gauging systems. The invention accurately determines three-dimensional measurement data for a workpiece through the use of a synchronized scanning process and without the need for expensive sensor positioning devices, such as CMMs.

While the invention has been described in its presently preferred form, it will be understood that the invention is capable of modification without departing from the spirit of the invention as set forth in the appended claims.

What is claimed is:

1. An apparatus for determining three-dimensional measurement data for the surface of an object, comprising:

a movable member;

a controller for causing said movable member to move in relation to the surface of the object;

a non-contact sensor disposed on said movable member for collecting image data representative of a portion of the surface of the object;

a position reporting device for reporting position data representative of the position of said non-contact sensor;

a timing signal generator for periodically generating and transmitting a synch signal, said position reporting device electrically connected to said timing signal generator and reporting position data in response to each of said synch signals, and said non-contact sensor being electrically connected to said timing signal generator and collecting image data in response to each of said synch signals; and a data processor adapted to retrieve image data from said non-contact sensor and position data from said position reporting device, and being operable to synchronize the image data with the position data, thereby generating a three-dimensional representation of the object.

2. The apparatus of claim 1 wherein said movable member scans the surface of the object, such that the image data reported by said non-contact sensor lags in time behind the position data reported by said position reporting device.

3. The apparatus of claim 1 further comprising a memory storage space for storing position data from said position reporting device, said data processor connected to said memory storage space for synchronizing the image data with the corresponding position data.

4. The apparatus of claim 1 wherein said non-contact sensor is a two-dimensional structural light sensor.

5. The apparatus of claim 1 wherein said non-contact sensor emits structured light in a predefined planar configuration and having an optical receiver for receiving reflected light emitted by said non-contact sensor, where the reflected light being indicative of the surface of the object.

6. The apparatus of claim 1 further comprising a kinematic correction module for applying a real-time correction to the position data received from the position reporting device based on a kinematic model of the movable member.

7. The apparatus of claim 1 wherein said position reporting device is further defined as photogrammetric measurement system.

8. A robot-based gauging system for determining three-dimensional measurement data of an object with respect to a reference frame, the gauging system of the type having a non-contact sensor mounted to a movable member of a robot for movement of the sensor relative to the object, comprising:
   a robot controller for controlling the movement of the movable member and reporting position data representative of the position of said movable member;
   a timing signal generator electrically connected to said robot controller for periodically generating and transmitting a synch signal, said robot controller reporting a set of said position data in response to each of said synch signals, thereby generating a plurality of position data sets;
   a non-contact sensor coupled to the movable member of the robot for capturing image data of the object, said non-contact sensor being electrically connected to said timing signal generator and responsive to each of said synch signals for capturing a set of image data representative of a portion of said object, thereby generating a corresponding plurality of image data sets representative of a plurality of portions of the object; and
   a vision system adapted to retrieve said plurality of image data sets from said non-contact sensor and to synchronize each image data set with a corresponding position data set, thereby generating a three-dimensional representation of the object.

9. The robot-based gauging system of claim 8 said movable member scans the surface of the object, such that each image data set retrieved from said non-contact sensor lags in time behind the corresponding position data set reported by said controller.

10. The robot-based gauging system of claim 8 further comprising a memory storage space for storing position data from said robot controller, said vision system connected to said memory storage space for synchronizing each image data set with the corresponding position data set.

11. The robot-based gauging system of claim 8 further comprising a kinematic correction module for applying a real-time correction to the position data based on a kinematic model of the robot.

12. The robot-based gauging system of claim 8 wherein said non-contact sensor is a two-dimensional structural light sensor.

13. The robot-based gauging system of claim 8 wherein said non-contact sensor emits structured light in a predefined planar configuration and having an optical receiver for receiving reflected light emitted by said non-contact sensor, where the reflected light being indicative of the surface of the object.

14. The robot-based gauging system of claim 8 further comprising a coordinate transformation system for transforming each position data set to a sensor reference frame, where the sensor reference frame is associated with said non-contact sensor.

15. A robot-based gauging system for determining three-dimensional measurement data of an object with respect to a reference frame, the gauging system of the type having a non-contact sensor mounted to a movable member of a robot for movement of the sensor relative to the object, comprising:
   a robot controller for controlling the movement of the movable member in relation to the object;
   a timing signal generator for periodically generating and transmitting a synch signal;
   a non-contact sensor coupled to the movable member of the robot for capturing image data of the object, said non-contact sensor being electrically connected to said timing signal generator and responsive to each of said synch signals for capturing a set of image data representative of a portion of said object, thereby generating a plurality of image data sets representative of a plurality of portions of the object;
   a photogrammetric measurement system for reporting position data representative of the position of said non-contact sensor by having a calibration field of observation and being positionable at vantage point such that said non-contact sensor is within the calibration field, said photogrammetric measurement system electrically connects to said timing signal generator and reporting a set of position data in response to each of said synch signals, thereby generating a plurality of position data sets; and
   a vision system adapted to retrieve said plurality of image data sets from said non-contact sensor and to synchronize each image data set with a corresponding position data set, thereby generating a three-dimensional representation of the object.

16. The robot-based gauging system of claim 15 said movable member scans the surface of the object, such that each image data set retrieved from said non-contact sensor lags in time behind the corresponding position data set reported by said controller.

17. The robot-based gauging system of claim 15 further comprising a memory storage space for storing position data from said photogrammetric measurement system, said vision system connected to said memory storage space for synchronizing each image data set with the corresponding position data set.

18. The robot-based gauging system of claim 15 wherein said non-contact sensor is a two-dimensional structural light sensor.

19. The robot-based gauging system of claim 15 wherein said non-contact sensor emits structured light in a predefined planar configuration and having an optical receiver for receiving reflected light emitted by said non-contact sensor, where the reflected light being indicative of the surface of the object.

* * * * *